United States Patent Office 3,532,409
Patented Oct. 6, 1970

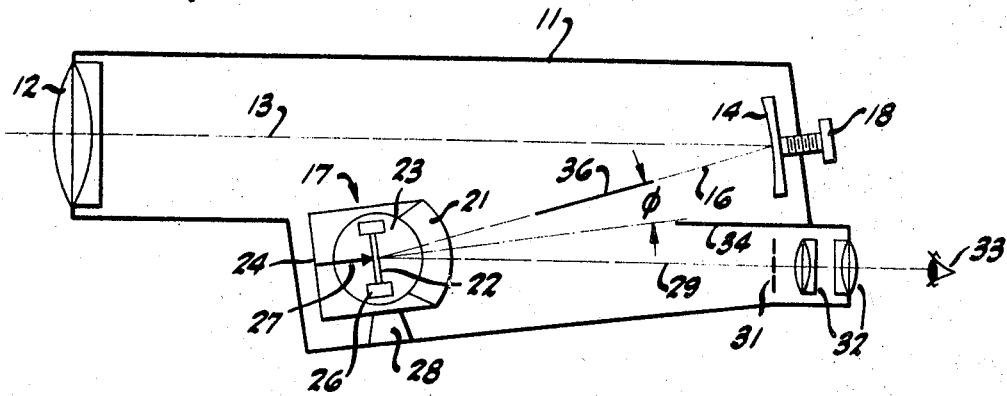
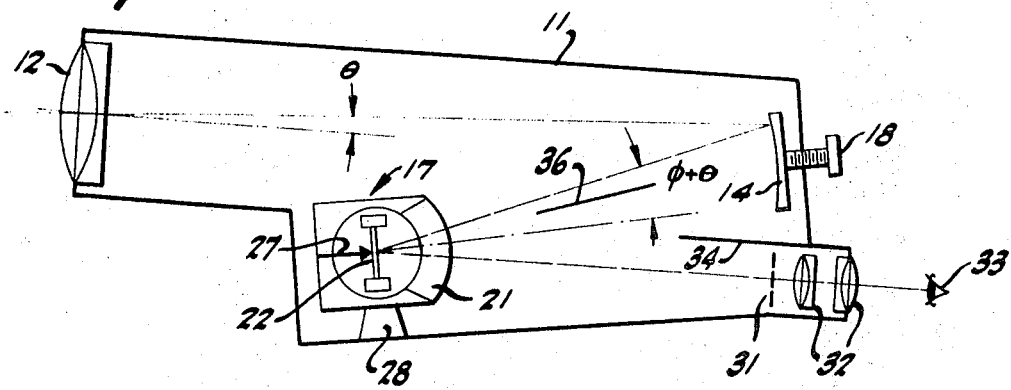
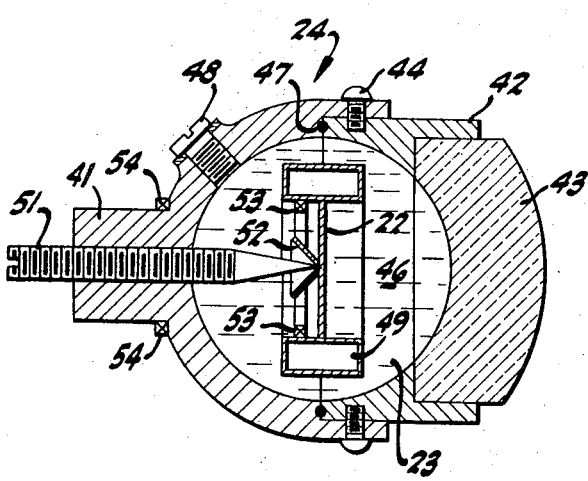

3,532,409
HYDROSTATICALLY-SUPPORTED OPTICAL STABILIZER
William E. Humphrey, Oakland, Calif., assignor to Optical Research and Development Corporation, Oakland, Calif., a corporation of California
Filed Sept. 4, 1968, Ser. No. 757,303
Int. Cl. G02b 23/00
U.S. Cl. 350—16                         9 Claims

ABSTRACT OF THE DISCLOSURE

An inertially stabilized compensating lens system comprising a chamber confining transparent fluid with one of the chamber walls having affixed thereto a lens with substantially concentric inside and outside surfaces. A fluid stabilized mirror, buoyantly supported substantially at the mirror center of gravity and buoyancy, is contained within the chamber and aligned by typically, a magnetic field, to reflect light received through the lens outwardly through the same lens at a deviated angle. Provision for incorporating the stabilized compensating lens system within an optical stabilizer is included.

---

The invention is generally directed to the field of optical stabilization, or accidental-motion compensation, for optical systems. The invention provides a stabilizing unit incorporating a hydrostatically-supported and inertially-stabilized plane mirror and a concentric lens through which light enters and exits the unit.

A wide variety of optical stabilization systems has been developed. It has long been recognized that the motion of uncompensated optical devices produces a movement of the focused image, so as to seriously degrade the viewing of same or photography of same. One category of prior art devices in this field may be denominated as the "stabilized-platform approach" wherein the entire optical device is stabilized against motion, as by mounting of same upon a gyroscopically-controlled platform, or the like. Another general category of optical stabilization systems employs some type of conversion of light into another type of beam, such as an electron beam, which may then be operated upon to insert corrections in the direction thereof as sensed by a gyroscope, or the like. A further general category of optical stabilizers employs means such as a gyproscope not only to sense angular deviations of an optical system from an original line-of-sight, but, also, to force one or more optical elements of the system to move in such a way as to compensate for such deviation. It is particularly noted that this latter category of stabilizers generally includes gyroscopes and consequently must operate within limitations of gyroscopes.

In addition to the foregoing, there has also been developed a class of inertially-stabilized systems, both refractive and reflective, for automatically redirecting light rays along the axis of the housing of an optical system during angular deviations of such housing from an original line-of-sight. Many of these systems have proven quite practical for a wide variety of applications. The present invention falls within this broad general category of inertially-stabilized systems but provides a very material improvement and simplification therein.

Optical stabilization, or accidental-motion compensation is of great importance in hand-held instruments wherein a substantial magnification is desired. It is almost impossible for a hand-held device, such as a camera or telescope, to be maintained entirely free from slight motions or tremors which, in the absence of compensation, cause this focused image to move. This problem becomes increasingly apparent with increased magnification, as optical magnifying systems not only magnify the image viewed, but also magnify relative motions thereof.

The inertially-stabilized unit and accidental-motion compensation system hereof provides a major simplification over prior art devices in this general field, while yet maintaining a high degree of optical stabilization that is particularly applcable for optical-viewing devices. This stabilizing unit is comprised of at least one lens having substantially concentric front and rear surfaces and an inertially-stabilized and hydrostatically-supported plane mirror behind such lens with the supporting fluid contacting the lens. The mirror is located to be pivotal about its center which is located substantially at the center of buoyancy of the mirror unit and the center of gravity thereof. Buoyancy tanks are provided for establishing the desired neutral buoyancy of the mirror and a point contact is provided at the rear of the center of the mirror for relative pivoting of the remainder of the unit about the mirror center. Provision is made to align the mirror to receive light from and reflect light towards the lens.

The stabilization unit is adapted to receive light through the concentric lens for reflection by the inertially-stabilized mirror in the fluid, with such light then being reflected back through the concentric lens at an angle to light incident thereon. The concentric lens thus serves a dual purpose or, in other words, operates as two lenses, one for incoming light and one for exiting light.

An overall system employing the stabilizing unit of the present invention employs an objective lens receiving light from the outside of the housing containing the optical system and having a focal length substantially twice that of the concentric lens of the stabilizing unit. A curved reflecting surface is located near the focal surface of the objective lens and also near the focal point of the concentric lens so as to reflect light at an angle to the original line-of-sight into the stabilizing unit. Light emanating from the concentric lens and traveling in the contained fluid is substantially parallel, in that the objective and concentric lens, or relay lens as it is hereinafter termed, may be considered as an afocal telescope having a folded light path. Consequently light leaving the concentric lens of the stabilizing unit, or relay lens of the overall system, has substantially parallel rays in the fluid medium for incidence upon the inertially-stabilized and hydrostatically-supported plane mirror of the stabilizing unit and reflection therefrom, again as parallel rays but at an angle to the incident light. Such parallel light rays are focused by the relay lens in repassage through another portion thereof so as to provide a stabilized image, which can be either camera stabilized or adapted for direct viewing with the eye.

In effecting stabilization, accidental motion of the housing encompassing the basic elements of the present invention will cause all of the elements to move with the housing through small angles about an original line-of-sight. The initially-stabilized and hydrostatically-supported plane mirror of the stabilizing unit will not follow such motions, but, instead, will remain in nearly fixed relation to the original line-of-sight. Consequently, the present invention provides a compensation for the housing motion insofar as optics are concerned. This compensation may be substantially one hundred percent, so as to dispose a focused image at the same place on a focal plane despite accidental motion of the housing as required for camera applications or alternately as required for optical-viewing devices. This latter modification is discussed in more detail below; however, for convenience of description, stabilization herein is referenced to one-hundred-percent stabilization, or camera stabilization, wherein a focused image is maintained in the same position upon a single focal plane regardless of small angular deviations of the housing from an original line-of-sight.

Provision is also made herein for traverse, or panning, of an optical device incorporating the present invention. This is accomplished by causing the inertially-stabilized and hydrostatically-supported plane mirror of the stabilizing unit to move with the housing and other elements of the optical train for very gradual and persistent angular motions of the housing.

The entire stabilization unit of this invention is quite simple, so as to thereby minimize overall complexity of optical stabilization and accidental-motion compensation for low-cost manufacture, minimization of weight, ruggedness and reliability of operation.

The present invention is illustrated as to a single preferred embodiment thereof in the accompanying drawing wherein:

FIG. 1 is a longitudinal sectional view in schematic form of a telescope in accordance with the present invention;

FIG. 2 is an illustration of the embodiment of FIG. 1 tilted at a small angle $\theta$ to an original line-of-sight and indicating the stabilization of light accomplished by the invention; and FIG. 3 is an enlarged sectional view of one embodiment of the stabilization unit of the telescope of FIG. 1.

The embodiment of the present invention illustrated in FIG. 1 comprises an elongated light-tight housing 11 having an objective lens, or lens system 12, disposd at the front end thereof for receiving light from the exterior of the housing. The objective 12 directs light along an optical axis 13 onto a curved reflecting surface 14 disposed interior of the housing adjacent the rear end thereof. Reflector 14 serves as a field flattener and light collector which concentrates light from the image along an inclined axis 16 onto stabilizing unit 17, which unit is disposed beneath the light path from the objective to reflecting surface 14. The objective, reflector 14 and stabilizing unit 17 are all fixed with respect to the case, although means such as the threaded mounting 18 may be provided to adjust the fixed position of the curved reflector 14.

With regard to the stabilizing unit 17, herein employed in the accidental-motion compensation system, it is first noted that this unit comprises much more than a mere stabilization lement. The unit 17 includes a concentric lens 21 having the front and rear surfaces thereof formed as substantially concentric surfaces. The lens 21 acting with the contained fluid serves as the second lens, or relay lens, of what may be considered as inverting afocal telescope comprised by the lenses 12 and 21. This optical train is here shown having a magnification of approximately two, as discussed in greater detail below, and the focal planes of the lenses 12 and 21 coincide approximately at the location of the curved reflector 14. It is possible for this common focal plane to lie slightly ahead of the curved reflector 14 along the incoming axis of light 13 or slightly behind the curved reflector insofar as this axis is concerned. In general, however, the common focal plane lies near the curved reflector 14.

In addition to the concentric lens 21, the unit 17 includes a plane mirror 22 which is supported in a fluid 23 disposed in a chamber within the casing 24 having the lens 21 extending through one side thereof. In practice, the chamber within the casing 24 is substantially spherical and appropriate buoyancy may be provided to the mirror 22 by the addition of a small buoyant volume 26 located about the mirror in the form of a hollow ring. This stabilizing mirror 22 rests against a pin 27 touching the back of the mirror at the center thereof and substantially at the center of the chamber, so that relative movement of the mirror and housing occur about the center of the mirror at the engagement of pin and mirror. Further details of the unit 17 are illustrated in FIG. 3 and described below. Suffice at this point to note that the case 24 of the unit 17 is fixed to the housing 11 internally thereof, as indicated at 28.

It is to be appreciated that light exiting an afocal inverting optical train of two power proceeds in substantially parallel rays and that, consequently, means must be provided to focus these rays in order to utilize them in an optical device such as a telescope. The present invention employs the concentric lens 21 as an objective for focusing light reflected from the mirror 22, so that such light then passes along an axis 29, either to a stabilized-image plane 31 in the case of a camera application or, in the present instance, into an ocular system 32 providing a stabilized image for the eye of a viewer. The difference in optical stabilization between camera applications and optical-viewing application is discussed further below.

Provision is also made herein to prevent light from passing directly from the objective 12 to the stabilized image plane 31 or oculars 32. A baffle 36 may be employed for this purpose, and note that the baffle is quite thin and is longitudinally aligned with the optic axis 16, so as to minimize interference with lght following intended paths through the device.

With regard to the unit 17 in general, it is noted that the mirror 22 is provided with just enough buoyancy to remain supported or neutrally buoyant in the fluid 23 of the chamber defined by the case 24 of the unit. The neutral buoyancy of the stabilizer has several important consequences. First, any shocks of the instrument as a whole are uniformly transmitted to the stabilizing element by the fluid rather than by the positioning pin 51, minimizing the chance of damage to the stabilizer. Secondly, the forces between the positioning pin and the stabilizer element are minimized insuring small frictional torque on the stabilizer. Movement of the case, as by rotation of same, thus exerts little torque upon the mirror 22, so that the mirror tends to remain in its original position when housing 21 undergoes angular deviations from an original line-of-sight. Consequently, light proceeding along the axis 16, for example, will strike the mirror 22 at a different angle when the housing 11 is rotated through some small angle by accidental motion of the device.

For considering further the operation of the present invention, reference is made to FIG. 2 illustrating the device of FIG. 1 rotated through a small angle $\theta$ which is exaggerated in the illustration in order to emphasize operation of the device. In practical applications it is expected that the present invention shall be operable over small-angle deviations, much less than that shown, so that under no normal circumstances would the light be displaced to the extent illustrated on the curved reflecting surface 14.

In operation of the stabilizer, the axis of light reflected from surface 14 in the position shown of FIG. 1 makes an angle $\phi$ with the perpendicular to the mirror 22. Such light in the position shown in FIG. 2 will make an angle $\phi$ plus $\theta$ to perpendicular from the surface of the inertially stabilized mirror 22. Consequently, as light is reflected at the same angle as it strikes a plane in mirror surface it will be reflected from this inertially stabilized mirror at an angle $\phi$ plus $\theta$ to the perpendicular of the mirror surface. This light is thus directed from the inertially stabilized mirror at an angle $\theta$ different from the original axis of the light reflection and this will be seen to be equal to the angular deviation of the housing from the line-of-sight.

It will be seen that the output of light from mirror 22 in FIG. 1 strikes the same portion of stabilized image plane 31 as the output of light in FIG. 2. In other words, the light emanating from mirror 22 has maintained the same angular relation with respect to housing 11, even though the entire housing has been deviated by an angle $\theta$. Consequently, the mirror by inertial stabilization thereof does serve to compensate for angular deviations of the housing containing the optical system from an original line-of-sight. The foregoing example is referenced to this camera stabilization of an image at the plane 31.

At this point it is particularly noted that the concentric nature of the lens 21 of the unit 17 serves to operate in a similar manner upon substantially all rays directed thereon. In distinction to alternatively-shaped lenses commonly employed in optical systems and optical-stabilization devices, off-axis rays are not operated upon a different manner from those illustrated. This feature is particularly important in the present invention wherein an angle is introduced into the optical path by reflection from the curved mirror 14. It is apparent that the above corrections are made in all movements of pitch and yaw.

Considering now certain details of the unit 17, reference is made to FIG. 3 illustrating a preferred embodiment of this unit. The casing 24 is illustrated to be comprised of a back piece 41 having a hemispherical indentation therein and the front piece 42 secured about a lens element 43 (corresponding to 21 in FIGS. 1 and 2). The lens 43 and front-case portion 42 together define a hemispherical inner surface and the tow casing portions 41 and 42 are joined together, as by threaded screws, or the like, 44 to thereby define a spherical chamber 46 within the casing. A sealing ring 47 may be provided about the joinder of the two casing portions to maintain the chamber 46 sealed. The lens 43 is formed with concentric outer and inner surfaces within the center of curvature of such surfaces lying at the center of the spherical chamber 46.

Within the chamber of the unit 17 there is disposed plane mirror 22 which is hydrostatically supported by a fluid 23 filling the chamber. This fluid may be placed in the chamber through a threaded plug 48 in the casing wall. It is desirable that the mirror 22 shall have just the appropriate buoyancy to stay at any position or location within the fluid 23, and to this end there is preferably provided one or more buoyancy tanks 49. In practice, the mirror 22 may have a circular configuration and the tank 49 be formed as a hollow ring around the circumference of the mirror, so as to add the requisite buoyancy to the mirror assembly.

Inasmuch as the mirror is supported by the fluid in the chamber 46, it is necessary to prevent a drift of the position of the mirror and also to insure that relative movement of the casing and mirror will occur with respect to the center of the mirror located at the center of the spherical chamber. To this end there is provided a pin 51 disposed in threaded extension through the rear portion 41 of the casing and having a tapered, pointed inner end adapted to touch the mirror 22 at the center thereof on the backside of the mirror. Additionally, there is provided a small centering cone 52 mounted on the backside of the mirror with the apex thereof at the center of the mirror and opening outwardly from the mirror so that the pin 51 extends into the cone with the point of the pin touching the apex of the cone. In order to insure that the mirror may not under certain circumstances move axially of the pin away from the same, there is provided a small force urging the mirror against the pin point. This very small force may be provided by a ring magnet 53 mounted, for example, behind the mirror about the inner side of the buoyancy tank 49, as shown, and cooperating with a small ring magnet 54 disposed exteriorly of the casing behind the mirror, as, for example, about a boss extending outwardly from the rear portion 41 of the casing and through which the pin 51 is threaded. The magnets not only hold the mirror against the pin as a pivot point, but also provide a small centering torque to the mirror assembly.

The unit 17, as illustrated in FIG. 3, will be seen to provide a plane mirror supportedly by a fluid 23 in a spherical chamber 46 with substantially no direct physical contact between this mirror and the casing of the unit (i.e. other than various fluid effects). It is to be noted that the center of buoyancy and center of gravity of the mirror assembly should substantially coincide with the center of the spherical chamber 46 whereat the pin-mirror contact occurs. The only external contact with the mirror is provided by the point of the pin 51 touching the apex of the centering cone 52 at the center of the mirror on the back thereof. This contact is merely provided to maintain the mirror generally in the center of the chamber and to prevent drift of the mirror. It should be noted that the weight of the mirror is not supported by the pin, and thus frictional forces are almost negligible. It is to be further noted that the centering cone 52 limits the possible angular deviation of the mirror and casing with respect to each other inasmuch as a sufficient rotation of the casing with respect to the mirror will cause the pin 51 to touch a side of the cone and thus move the mirror with the casing for further angular motion.

In usage of the present invention, and angular deviation of an optical device will cause the casing 24 thereof to rotate, as, for example, in the plane of the FIG. 3. This rotation is of a very small order, at the most a few degrees and is expected to occur in a random manner, as, for example, by the instability of a hand-held device. Although the casing 24 of the unit 17 rotates some few degrees, such motion is not greatly imparted to the mirror 22. The substantial absence of coupling between the casing 24 and mirror 22 results in the mirror maintaining its original angular orientation by inertial stabilization; the inertia of the mirror assembly itself as well as the surrounding fluid causes it to remain in the same position despite small angular movements of the casing thereabout. It is to be particularly noted that the magnets 53 and 54 do not provide sufficiently strong coupling between the mirror and casing to cause the mirror to rotate with the casing for angular deviations in the frequency range which most need compensation. These magnets are provided primarily for the purposes of initially centering the mirror by providing a centering torque and of very lightly holding the mirror against the point of the pin 51 to prevent possible long-term orientation or position drift of the mirror from the desired and necessary location substantially on a fixed bisector of the sphere of the chamber in spite of any small residual unbalance of the mirror and float assembly. However, the magnetic coupling also provides the torque required to cause steady, long-term angular motion of the housing to impart a like motion to the stabilizer mirror assembly, allowing the instrument to track a moving object or scan a field of view while maintaining the stabilizing junction against rapid, accidental case motions.

Further, with regard to the stabilizing unit 17, it is noted that the fluid 23 therein may be subject to expansion and contraction with temperature variation; thus provision is to be made for accommodating same. This may be accomplished by employing an expansion bladder, or the like, communicating with the chamber 46, preferably at the rear thereof. The fluid 23 supports the mirror assembly by buoyancy of the latter in the fluid. The viscosity of this fluid is useful to dampen out any oscillations that might result from the use of a restoring torque to keep the mirror aligned on the pin, and it has been found that critical damping, or more, is quite satisfactory in actual practice. It is also to be noted that more than one fluid may be employed in order to achieve desired optical correction in the assembly. The stabilizing unit may, for example, incorporate a plurality of fluid chambers separated by spherical glass walls and containing different fluids each having a different index of refraction and dispersion for employing the optical properties of these successive fluids to enhance the degree of optical correction achieved.

As a further consequence of the utilization of a fluid about the mirror, there is achieved a minimization of necessary mirror diameter. With the objective 12 and relay lens 21 providing an inverting two-power magnification, it would normally be necessary for the mirror to have a diameter which is one-half that of the objective; however, this is modified herein by the index of refraction, $n$, of the fluid. Consequently, the mirror diameter is approximately 1/2n of the diameter of the objective.

A further advantageous result attained with the stabilizing unit 17 hereof is the ability to accommodate relatively high traverse rates, or panning rates, of an optical device employing the present invention. The optics of this invention center over a reasonable panning period to thereby allow a very high pan rate, while yet providing viewing through nearly centered optics; these panning rates are generally greater than those available with systems employing gyroscopes.

Stabilizing unit 17 serves a multitude of purposes. The concentric lens, or relay lens, of the unit operates in conjunction with the objective 12 of the device to form an inverting afocal optical train of substantially two power as the light impinges on the mirror. This is important in achieving the requisite compensation, for a plane mirror inertially stabilized at a random point in a light path will not produce the compensation desired, as may be deduced from a consideration of the optics involved. The stabilizer also provides for the utilization of an inertially-stabilized plane mirror in the optical path by the utilization of the inverting two-power optical arrangement incorporating the curved reflecting surface 14 to redirect the light path to achieve a practical device configuration. In addition to serving as the "eyepiece" for the objective 12, the unit 17 also incorporates the inertially-stabilized mirror as described in detail above. An extremely simple inertial stabilization is seen to be provided hereby, although it is noted to be possible, if desired, for the mirror to be rotated, as, for example, about an axis through the center thereof in the plane of FIG. 3 and from an external drive not physically coupled to the mirror in order to achieve a gyroscopic effect for enhancing the inertial stabilization of the mirror. Additionally, the concentric nature of the lens of the unit 17 excludes many of the aberrations normally associated with lenses. Problems of coma, astigmatism and the like do not occur herein, for "off-axis rays" are not affected differently than those on axis. There is no lateral chromatic aberration, and the only problems encountered with this particular lens are longiutdinal chromatic aberration and spherical aberration. There is also, of course, a curvature-of-field effect, but in the present invention this is largely compensated for by the field flattener comprising the curved reflecting surface 14. Insofar as longitudinal chromatic aberrations and spherical aberrations are concernned, these can be corrected by appropriate dimensioning of the lens and chambers and by appropriate choice of materials of the concentric lens and liquid within the chamber. An appropriate choice of indices of refraction would be 1.6 for the curved lens, as may be provided, for example, by a flint glass and 1.4 for the hydrostatically-supporting liquid within the chamber as might, for example, be provided by a fluid such as a glycol-water mixture.

With regard to the primary object of the present invention, i.e., optical stabilization or accidental-motion compensation for optical devices, it is noted that somewhat different stabilization is required for camera applications than for optical-viewing devices. In the circumstance wherein the present invention might be employed to optically stabilize an image for a camera, it is desired that the image be stabilized at a fixed plane within the housing, and such stabilization may be termed "camera stabilization", or one-hundred-percent stabilization. On the other hand, stabilization for an optical-viewing device requires slightly greater or lesser amounts of stabilization, depending upon whether or not the device is an erecting system or an inverting system. It will be appreciated that stabilization of an image at a fixed plane would not generally be satisfactory for a telescope, for example, inasmuch as a viewer would thus see the fixed plane moving with an accidental motion of the telescope and would, consequently, view a moving object or image. It is possible to calculate the modification of compensation, or stabilization, required for optical-viewing devices, and such calculations provided the modifying factor $$\left(1 \pm \frac{1}{M}\right)$$

wherein M is the overall magnification of the entire optical device. The minus sign is employed in the factor for non-inverting (or erect image) systems and the plus sign for inverting systems. In the present invention this factor may be employed to modify the power of the afocal optical train, i.e., the optics previous to the stabilizing mirror, so as to achieve the desired compensation for optical-viewing devices by dividing the nominal power of 2 by the appropriate factor.

It is noted that in the foregoing description, the curved reflecting surface 14, serving as a field flattener as well as means for redirecting and concentrating incoming light from the objective, may be mounted in adjustable position within the housing. It is not contemplated that this curved reflecting surface will be moved during usage of the device, but, instead, that it will be set in the appropriate position for optimum operation of the invention and, preferably, left in such position unless this element is to be employed for focusing. As noted above, the curved reflecting surface 14 is located near the focal plane of the objective and of the relay lens 21 and objective 12 of the afocal optical train. It is possible for the focal plane of these lens elements to lie either in front of the curved reflecting surface or behind same by some small amount. This curved reflecting surface not only corrects the normal curvature of field of the objective and eyepiece but, also, serves to collect light and thus facilitate efficient light transmission through the device. It is important that the reflecting surface 14 be located near the rear image in order to accomplish these functions without introducing noticeable abberations.

The utilization of a curved field mirror so as to direct light at an angle to the incoming axis of light does cause a slight reduction in obtainable compensation. This reduction, however, is so small as to constitute no problem for a majority of applications; and, in one practical device constructed in accordance with the present invention, the reduction in compensation from the tilted mirror effect was of the order of plus or minus 1/100. Insofar as the curvature of the field mirror 14 is concerned, it is noted that the radius of the curvature should be approximately intermediate the focal length of objective and relay lens and that some variations in the actual curvature may occur over the surface thereof at the desire of the designer. Thus, the mirror 14 need not exactly conform to a spherical surface but may depart therefrom within reasonable limitations.

What is claimed is:

1. A device for stabilizing images within an optical train comprising: a lens; a fluid containing chamber having said lens forming a portion of the walls thereof; a transparent fluid within said chamber having a predetremined density contacting said lens at said concave inside surface; a mirror assembly with a predetermined mass having coincident centers of gravity and buoyancy supported within said fluid; means for pivoting said mirror assembly at said coincident centers of gravity and buoyancy in optical alignment for receiving from and reflecting light toward said lens, whereby the inertia of said fluid and mirror maintains its alignment against small sudden angular deviations of said device; and means for correctively biasing said mirror about said pivoting means to maintain a preselected disposition of said mirror towards said lens, said correctively biasing means having a torque substantially ineffective against the inertial effect of said fluid and mirror when said chamber is suddenly angularly deviated.

2. A device for stabilizing images according to claim 1 and wherein said correctively biasing means includes means for generating an artificial magnetic field attached to said chamber, and means for seeking a predetermined alignment within said field attached to said mirror assembly.

3. A device for stabilizing images according to claim 1 wherein said fluid has a viscosity for damping said mirror assembly against oscillations resulting from torques exerted thereon said correctively biasing means.

4. A device for stabilizing images according to claim 1 and wherein said chamber is spherical and said mirror assembly is pivoted at the center of said spherical chamber.

5. A device for stabilizing images within an optical train comprising: a lens; a fluid containing chamber having said lens forming one of the walls thereof; a transparent fluid within said chamber; a mirror assembly having coincident centers of gravity and buoyancy and neutrally buoyantly supported by said fluid; pivot means on one side of said mirror disposed at a position at the center of gravity and buoyancy of the mirror assembly and positioned to dispose the reflecting surface of said mirror in optical alignment towards said lens; biasing means attached to said mirror and chamber coupling said mirror to a preselected optical alignment toward said lens, said biasing means having a torque on said mirror substantially ineffective against the inertial effect of said mirror when said device is suddenly angularly deviated in space.

6. A device for stabilizing images within an optical train according to claim 5 and wherein the buoyancy of said mirror assembly within said fluid is neutral.

7. A device for stabilizing images according to claim 5 and wherein said biasing means urges said mirror assembly towards said pivot means.

8. A device for stabilizing images according to claim 5 and wherein: said biasing means includes at least one first magnet affixed to said chamber for generating a magnetic field therewithin and at least one second magnet attached to said mirror assembly for aligning said mirror with respect to said magnetic field.

9. A device for stabilizing images according to claim 5 and wherein said chamber is substantially spherical.

References Cited

UNITED STATES PATENTS

| | | | |
|---|---|---|---|
| 1,966,850 | 7/1934 | Colt | 356—143 |
| 2,118,045 | 5/1938 | Holton | 356—250 |
| 2,557,340 | 6/1951 | Carbonara | 356—250 |
| 2,944,783 | 7/1960 | Macleish et al. | 356—255 XR |
| 3,164,073 | 1/1965 | Merritt | 95—1.1 |
| 3,434,771 | 3/1969 | Alvarez | 350—16 |

FOREIGN PATENTS 23,141  10/1921  France.

PAUL R. GILLIAM, Primary Examiner